Dec. 3, 1968    J. I. M. ARTAJO    3,414,750
DIACHRONOUS ELECTROMAGNETIC COUPLING
Filed Jan. 8, 1965    2 Sheets-Sheet 1

INVENTOR
José Ignacio Martin Artajo

BY Steinberg and Blake
ATTORNEYS

Dec. 3, 1968

J. I. M. ARTAJO 3,414,750

DIACHRONOUS ELECTROMAGNETIC COUPLING

Filed Jan. 8, 1965

INVENTOR

JOSÉ IGNACIO MARTIN ARTAJO

BY *Steinberg and Blake*

ATTORNEYS

United States Patent Office 3,414,750
Patented Dec. 3, 1968

3,414,750
DIACHRONOUS ELECTROMAGNETIC COUPLING
José Ignacio Martin Artajo,
Alberto Aguilera 25, Madrid, Spain
Filed Jan. 8, 1965, Ser. No. 424,366
Claims priority, application Spain, Jan. 13, 1964,
295,262
10 Claims. (Cl. 310—105)

ABSTRACT OF THE DISCLOSURE

A magnetic coupling for transmitting a drive between coaxial rotary driving and driven assemblies. These assemblies include an inner assembly and an outer assembly surrounding and spaced from the inner assembly. The outer assembly is in the form of a cylindrical drum or casing which carries short-circuited conductors as well as magnetically permeable components. The inner assembly includes substantially rigid, ring-shaped, magnetically permeable bodies at least some of which are permanent magnets. While the inner assembly does not require an exciting coil, such a coil may be included for control purposes in certain installations. In certain installations these assemblies are axially shiftable one with respect to the other so that the extent to which the outer assembly overlaps the inner assembly can be regulated.

---

The problem of the coupling of an internal combustion engine, and even more of a gas turbine, to a system which uses variable speed, such as a traction system, including the function of elevating, has not yet been satisfactorily solved.

This problem includes various functions which attempts have been made to solve on a more or less independent basis. Such functions may be enumerated and defined as follows:

(1) *The clutch function.*—It very frequently happens that the motor has to function for both long and short periods of time with no load, ordinarily running slowly (declutched, freewheeling, with the engine throttled down) in order not to have to be started up again and again with the corresponding work for the electrical starter system.

The mechanism which carries out this function is the clutch, which has as its fundamental elements the clutch linings which through mechanical friction connect or disconnect the transmission shaft to or from the engine which is running.

(2) *The coupling function.*—Coupling consists in the union between the engine shaft (primary) and the shaft of which use is being made (secondary) in such a manner that the dynamic energy is transmitted with a minimum of loss.

There exist couplings of various types—rigid, elastic, articulated, sliding, etc., according to the form given to this union between the primary and the secondary.

Various systems have been devised to achieve this function of coupling: in our case by mechanical systems of linings, discs; by hydraulic systems (e.g. oil); by electromagnetic systems: plates, discs, drums, both sliding and non-sliding.

(3) *The reversing function.*—Bound up with the functions that have just been mentioned is a subsidiary function which facilitates, by stages or in a continuous manner, the adaptation of the load, with its accelerations, de-accelerations, and highly variable speeds and torque, to the motor (cylinder or turbine type) the speed of which is generally almost constant.

The mechanical changes which are effected by toothed pinions, planetary pinions, oil turbine-pump, etc., in various forms are well known.

(4) *The differential function.*—In the case of vehicles, it is very important that the outer wheel, when a curve is being taken, shall turn at a higher speed than the inner wheel: this is achieved by a system which permits this difference in speeds (negative differential) or by a system which causes the outer wheel to revolve by itself at a greater speed and with higher torque than the inner wheel. The conventional systems of differential are negative: the steering-wheel and the fact that the vehicle hugs the road force the wheels to take the curve.

(5) *The braking and shock-absorbing function.*—In order to reduce speed and the abrupt variations to which it is subject in motors, loads and in vehicles, it is necessary to absorb the kinetic energy of the masses in movement, very often to the extent of bringing the system to a standstill, as well as the irregularities of the motor resistant impulses.

This function is carried out by friction brakes of the drum or disc type, operated by air under pressure, by a vacuum system or by electromagnetic controls, and at times by reversing the motor.

Now, the subject of this application is a system of electromagnetic and mechanical elements which can jointly perform the five functions to which reference has been made, or one or several of them in accordance with the need of a more economical, suitable and useful system for many types of applications.

The complete system, which in the case of a more simple application becomes reduced to three, two and even one of its elements, has as its fundamental basis a sliding electromagnetic coupling with a variable inductor, constituted by (a) strong permanent magnets in the form of a ring, perfectly constituted and easily incorporated into the magnetic circuit; (b) an induction coil which regulates the field of induction within the limits calculated; (c) arcs with alternated and bevelled polar expansions.

This system is much more reliable and economical in construction than the systems employed up to the present, which consist of numerous individual permanent magnets which are difficult to fix; in addition, our system has one single regulating coil perfectly situated, and nevertheless the whole complex constitutes a heteropolar inductor which is much more effective than the homopolar one, since it permits machines of high inductance reaction (up to 100 percent), and consequently better use of the material in regard to weight, volume and price.

The electromagnetic coupling is sliding (asynchronous), and consequently it changes the characteristic of the motor (at a constant speed) by adjusting it to the speed and the resistant torque, this being achieved in a smooth and continuous manner.

Again, this coupling absorbs the oscillations and abrupt changes of the resistant pitch and of the engine torque, which ensures the long life of the whole motor and load systems. Moreover, when the resistant torque reaches a dangerous value, the coupling disengages itself, since once this value of maximum torque is exceeded the characteristic of the torque is unstable; and even though the induction has to support a greater intensity, the heating is perfectly tolerable, since the conditions for cooling the said induction are optimum: it is, thus, a coupling which limits the maximum torque.

With the aim of facilitating a more exact interpretation of the subject of this patent application, in the attached drawings, which are complementary to this present exposition, practical examples for its industrial putting into practice are shown: these examples, as well as the description which corresponds to them, are included only by way of information concerning the present invention, and are in no way exhaustive.

In the above-mentioned drawings FIGURE 1 corresponds to a section through the diameter of a diachronous coupling in its most characteristic form of implementation.

Figure 1:
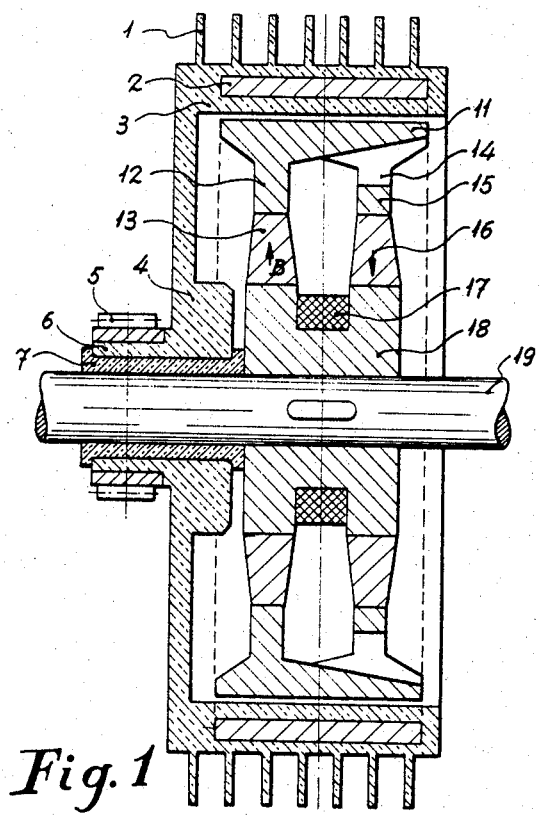
Figure 3:
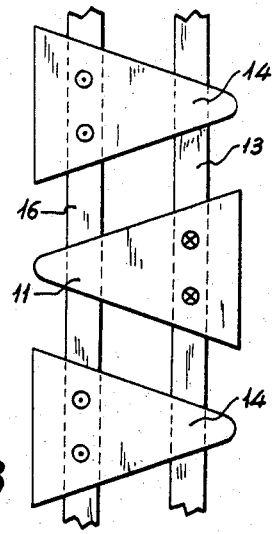
FIGURE 3 shows a detail of the upright arrangement of the polar elements of the inductor.
Figure 4:
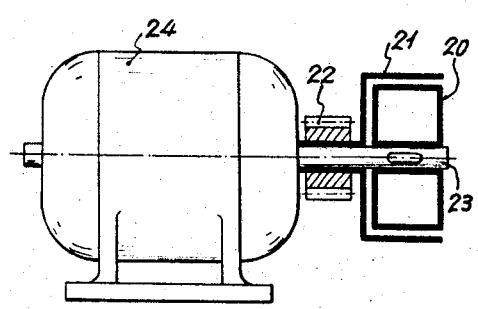
Figure 2:
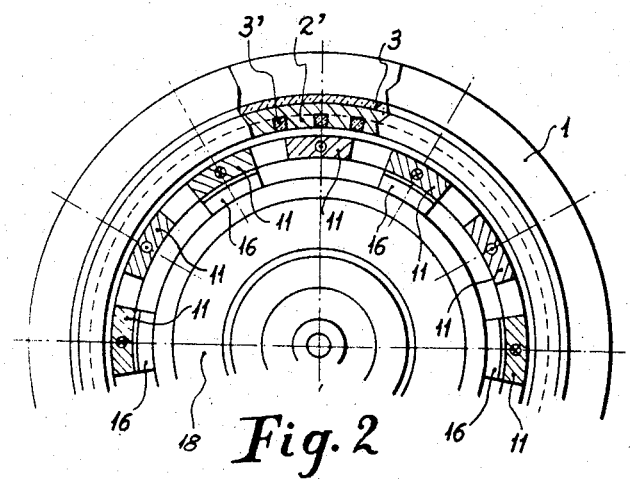
FIGURE 2 shows a transversal section of the coupling represented in FIGURE 1.

FIGURE 4 corresponds to an example of the application of the coupling represented in FIGURES 1, 2 and 3 to an electric motor.

Figure 5:
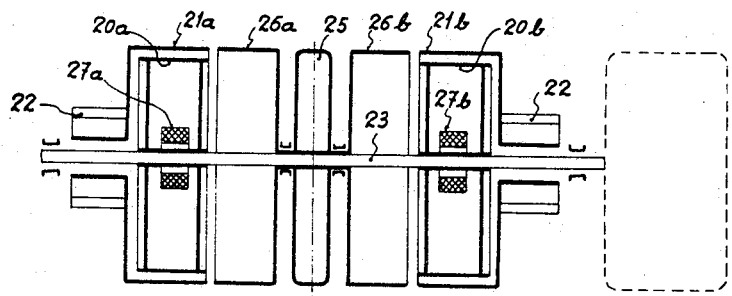

FIGURE 5 represents a form of application of the diachronous electromagnetic coupling to the driving shaft of a vehicle, with clutch and differential.

Figure 6:
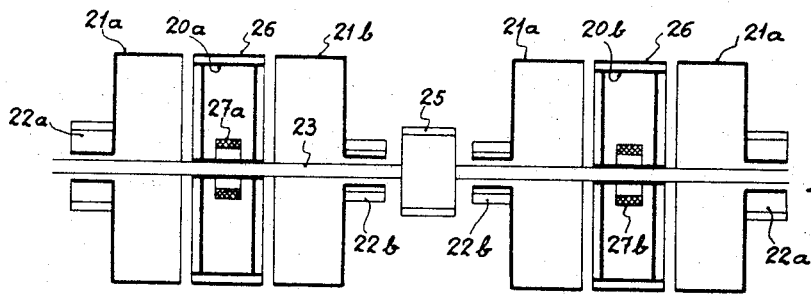

FIGURE 6 shows a form of application of the diachronous electromagnetic coupling to the driving shaft of a car with gearshift.

Figure 7:
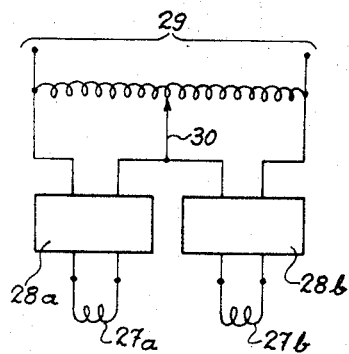

FIGURE 7 is a diagram which shows the form of compensated excitation of the coils which regulate the inductors of the diachronous electromagnetic couplings of the example which corresponds to FIGURES 6 and 7.

Figure 8:
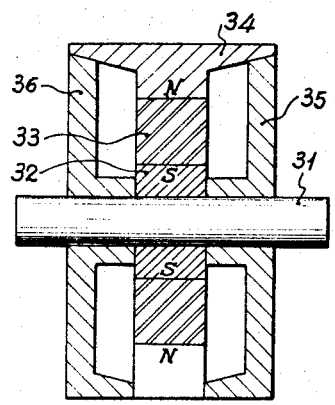

FIGURE 8 is a sectional elevation of another embodiment of an inner rotary permanent magnet assembly of the invention.

Figure 9:
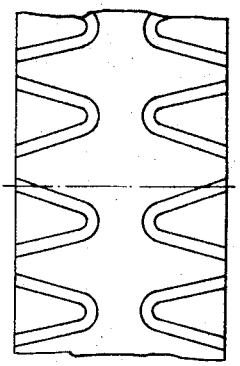

FIGURE 9 is a fragmentary top plan view of the structure of FIGURE 8.

As is shown in FIGURES 1, 2 and 3, the coupling which is the subject of this present invention is essentially constituted by two organs arranged coaxially, the one being housed in the other, and both being susceptible to being rotated.

The inductor element is constituted by an outer rotary assembly in the form of a drum or a casing 3, of substantially cylindrical form, mounted on the shaft 19 by means of the bearing 7 coupled to its central part 4, which central part has fixed to it on the exterior, by means of the sleeve 6 the driving pinion 5 for the power take-off. On its periphery are the cooling fins 1.

The cylindrical housing described above is constituted by a ferromagnetic induction circuit 2 formed by stacked laminations or equivalent material, which, as is shown in FIGURE 2, has trapezoidal conductors 3', which are preferably of aluminium, lodged between the teeth 2'. The said conductors 3' are connected in shortcircuit by means of lateral rings and an exterior layer with lugs which act as an additional return connection for the current induced in them.

In the interior of the outer assembly there is housed the inner rotary assembly or inductor element constituted by a double polar wheel formed by polar pieces 11 and 14 of triangular or quadranguler bevelled form, as is shown in FIGURE 3: these pieces alternately correspond to poles of different signs on their being coupled respectively to the permanent magnets in the form of rings 13 and 16, which are connected to the polar pieces by means of their respective rings 12 and 15 and to the casing of ferromagnetic material or the permanent magnet 18.

In consonance with the form of construction described, the polar pieces 11 and 14 are inserted into the periphery of the polar wheel, constituting a heteropolar inductor which closes its lines of force through the magnetic circuit 2 of the induction.

The armature 18 in annular form has fixed, in its central grooved part, a coil 17 the variable excitation of which determines the control of slippage between the induction and the inductor, and facilitates the remagnetization of the permanent ferromagnetic system of the inductor should this become necessary.

The inductor armature is mounted to form a solid element with the shaft 19 so that it will rotate with the latter. In one form of construction, as shown in FIGURES 1, 2 and 3, it is fixed by means of a key on the said shaft.

Other constructional forms may be different from that which is represented, for instance by carrying out the fitting of the two organs of the coupling on two independent shafts, one of which is tubular and houses the other, in which case the housing is mounted in a fixed form on its corresponding shaft. Other constructional forms can be carried out, always being based on the fundamental characteristics of the present invention.

As shown by the example represented in FIGURES 1, 2 and 3, the magnetic circuit of the permanent magnet 18 is closed by means of induction circuit 2. When the inner induction assembly rotates, its lines of force cut the shortcircuit conductors 3', inducing in them a current of great intensity which, due to an effect similar to that which takes place in asynchronous motors, moves in the same direction of rotation as the inner assembly. Once both parts are in movement, their speed of rotation differ with respect to one another due to a slippage which depends upon the load and the magnetic field generated by the magnet, which is regulated by means of the variable excitation of the coil 17 so that the extent of slip may at all times be adjusted, and, in consequence, the ratio of velocities between the motor and the driven system.

The direction of magnetization of the coil may be the same as, or opposite to, that of the permanent magnet, in accordance with the connection of the said coil to a source of direct current. This connection is preferably achieved by means of a transformer 29 (FIG. 7) and some rectifiers (28a and 28b) connected to a controllable point 30 with the aim of graduating the magnetic field of the said coil.

In the form of application shown in FIGURE 4, the electromagnetic coupling is mounted on the shaft 23 of a motor 24. In this case there is no need for the coil regulating the sliding movement, so that the inductor 20, shown in schematic form, consists only of a permanent magnet of the type previously described. The load is coupled to the toothed wheel 22 which forms a solid element with the driven outer induction assembly 21, which is also of the type previously described. Under these conditions, the coupling acts as a torque damper, which makes it particularly suitable in the motors of hauling machines which operate by impulses, and above all during the starting period so that it may be smoother.

In FIGURE 5 another form of application is shown, corresponding to the coupling of a traction shaft of a vehicle. In this case the inductor is susceptible of being axially displaced so as to be housed in the normal induction 21a or 21b in clutch operating position or in the ferromagnetic jackets 26a or 26b respectively when it is in the declutched position. The purpose of these said jackets is to avoid the demagnetization of the magnet in the periods when the coupling is not being operated. Both inductors are coupled by means of a device of well-known type to a mechanical control, so that the axial movement of the two inductors is simultaneous and opposite, there thus being produced the clutch connection with the wheels of the vehicle. The control of the sliding movement, and consequently of the speed of the wheels is achieved by means of the excitation of the coils 27a and 27b in the manner described above.

With the object of obtaining a differential effect between the speeds of turning of both wheels, as is necessary in the driving wheels of cars, the regulating coils 27a and 27b are connected in the form represented in the electrical diagram of FIGURE 7.

The said connection consists of the transformer or autotransformer with variable tappings in its center by means of the slider 30, which is connected to a source of alternating current 29. The rectifiers 28a and 28b are connected, in consequence, to sources of current of complementary voltage, and thus determine the feeding of direct current to the respective coils 27a and 27b in such a manner that with the slider linked to the steering wheel of the vehicle by means of a conventional mechanism, a greater slipping movement is produced in one wheel than in the other and, consequently, an adequate variation in speed.

The regulation of speed by means of the variation of the slipping movement is also achieved very efficiently by introducing the inductor or inductors 20a and 20b to a greater or lesser extent into the respective outer driven assemblies. The greater or lesser length of the conductors 2' subjected to the magnetic field of the inductors permits a more or less intensive electromagnetic concentration, and, in consequence a torque and a slip that are susceptible to control.

In FIGURE 6 another form of application is shown: the possibility of obtaining two steps or stages of speed. In this case the inductions form a pair per inductor. Accordingly as the inductor is inside the induction 21a or 21b, the transmission of power to the receiving system is effected by means of the pinions 22a or 22b, each of which has a differing number of teeth. The magnetic jacket 26 is also of tubular form. The coils 27a and 27b may be connected in the form shown in FIGURE 7.

In consonance with one constructional variation of the invention, a single magnetic ring may be used in place of the two different rings in the rotor which is shown in FIGURES 8 and 9, in which there are indicated:

31, shaft of magnetic material
32, butt end of the coupling
33, magnetic ring
34, 35, 36 polar expansion FIGURE 9 shows the upright arrangement of the polar expansions in the air gap clearance.

The magnet presents, in this case, a radial magnetism.

The principle of operation is similar to that described in the case of two magnetic rings, with the difference that, whilst in the other version there was a flux in series in the two armatures, in this new version the flux is parallel in the sense that, emanating from the same magnet, it divides up into two branches corresponding to the lateral extensions, to effect in return through the central extension.

*Applications.*—Just as in the case of the coupling previously referred to, this device serves for all those machines in which it is necessary to transmit a torque (fixed or variable) without losses through friction: for which reason it has no practical speed limitation. For instance: clutches of motors, permanent brakes in auto vehicles, positive differentials, torque-limiting clutches (protection against overloads). In all these cases it is of interest to employ very high speeds in order to obtain power with less weight, for example a throttling-down device coupled to a speed-increasing gear instead of direct to the transmission shaft, which represents a very considerable saving.

There having been sufficiently described the nature of the invention as well as various forms for its implementation and industrial application, it only remains to add that in the invention as a whole and in its constituent parts it is possible to introduce changes in the materials, form and arrangement, provided that there is no variation in its basic idea involved.

Thus, it will be seen that with the structure of the invention the magnetic coupling includes coaxial driving and driven assemblies which include an inner assembly and an outer assembly surrounding the inner assembly when these assemblies are in an operative relation with respect to each other. The outer assembly has the short-circuited conductors and magnetically permeable laminations, while the inner assembly may be composed in its entirety of substantially rigid ring-shaped bodies at least some of which are permanent magnets. For purposes of control, however, this inner assembly may also include an exciting coil. These assemblies are also axially displaceable one with respect to the other, as described above in connection with FIGS. 5 and 6, so that additional controls can be achieved by regulating the extent to which the assemblies overlap each other and so that it is possible for the assemblies to be displaced from their operative positions with respect to each other to an inoperative position, although, as is the case in FIG. 6, a number of outer assemblies can be provided to receive a given inner assembly for the purpose of achieving different transmission ratios. When an inner assembly is shifted beyond the outer assembly to an inoperative position, it may be situated within a ferromagnetic drum or jacket to avoid demagnetization of the permanent magnets of the inner assembly when it is in its inoperative position.

What I claim is:

1. In a magnetic coupling, a pair of coaxial rotary assemblies one of which drives the other, said assemblies respectively including an inner assembly and an outer assembly surrounding said inner assembly, said outer assembly carrying short-circuited conductors and magnetically permeable components and said inner assembly including ring-shaped, substantially rigid, magnetically permeable bodies at least some of which are permanent magnets.

2. The combination of claim 1 and wherein said inner assembly is constituted in its entirety by said bodies so that it does not include any coils.

3. The combination of claim 1 and wherein said inner assembly includes an exciting coil for controlling slippage between said assemblies.

4. The combination of claim 1 and wherein said assemblies are axially movable one with respect to the other to regulate the extent to which they overlap.

5. The combination of claim 1 and wherein a pair of said outer assemblies are provided, said inner assembly being axially shiftable into one or the other of said pair of outer assemblies, and said pair of outer assemblies respectively forming parts of transmissions of different transmission ratios, respectively.

6. The combination of claim 1 and wherein said assemblies are axially shiftable one with respect to the other between an operative position where said outer assembly surrounds said inner assembly and an inoperative position where said inner assembly is located axially beyond said outer assembly.

7. The combination of claim 6 and wherein a ferromagnetic drum surrounds said inner assembly when it is in its inoperative position displaced axially beyond said outer assembly.

8. The combination of claim 1 and wherein a pair of coaxial inner assemblies respectively coact with a pair of said coaxial outer assemblies, said outer assemblies being adapted to be connected in the drives to a pair of wheels, and a pair of exciting coils respectively connected operatively with said pair of inner assemblies for controlling the latter to provide regulation of slippage between the coacting pairs of inner and outer assemblies to achieve a differential drive for said wheels.

9. The combination of claim 1 and wherein said inner assembly includes a pair of coaxial ring-shaped permanent magnets one of which carries a plurality of outer circumferentially spaced extensions of one polarity and the other of which carries a plurality of circumferentially spaced extension of a different polarity respectively alternating with said extensions of said one body.

10. The combination of claim 1 and wherein said inner assembly includes an intermediate ring-shaped permanent magnet body having at its outer periphery axially extending circumferential flanges respectively formed with notches circumferentially distributed about each flange, and a pair of end ring-shaped bodies situated at opposed sides of said intermediate body and respectively having radial extensions received in said notches, respectively.

References Cited

UNITED STATES PATENTS

| 2,606,948 | 8/1952 | Jaeschke | 310—105 |
| 2,648,020 | 8/1953 | Jaeschke | 310—105 |
| 3,051,859 | 8/1962 | Farrell | 310—105 |

ROBERT K. SCHAEFER, *Primary Examiner.*

HERMAN O. JONES, *Assistant Examiner.*